US006968869B2

(12) United States Patent
Eckhardt

(10) Patent No.: US 6,968,869 B2
(45) Date of Patent: *Nov. 29, 2005

(54) SEALING APPARATUS

(75) Inventor: Arnold Eckhardt, Randstadt (DE)

(73) Assignee: Sumitomo Rubber Industries, LTD, Hyogo-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/861,669

(22) Filed: Jun. 4, 2004

(65) Prior Publication Data

US 2004/0216806 A1 Nov. 4, 2004

Related U.S. Application Data

(63) Continuation of application No. 09/827,537, filed on Apr. 6, 2001, now Pat. No. 6,766,834, which is a continuation of application No. PCT/EP99/07437, filed on Oct. 5, 1999.

(30) Foreign Application Priority Data

Oct. 8, 1998 (DE) ................................ 198 46 451

(51) Int. Cl.[7] ................................ B65B 31/00

(52) U.S. Cl. ................................ 141/38; 141/9; 141/102; 141/105; 141/330

(58) Field of Search ................................ 141/1, 4, 5, 9, 141/38, 67, 100, 102, 105, 329, 330; 152/154.1; 137/625, 625.4, 597

(56) References Cited

U.S. PATENT DOCUMENTS

| | | | | |
|---|---|---|---|---|
| 6,736,170 B2 * | 5/2004 | Eriksen et al. | ................ | 141/38 |
| 6,766,834 B1 * | 7/2004 | Eckhardt | ................ | 141/38 |
| 6,789,581 B2 * | 9/2004 | Cowan et al. | ................ | 141/38 |

* cited by examiner

*Primary Examiner*—Timothy L. Maust
(74) *Attorney, Agent, or Firm*—Fitch, Even, Tabin & Flannery

(57) ABSTRACT

The invention relates to a device for sealing inflatable objects, especially tires, consisting of a container that contains sealing agents and has a gas inlet which can be connected to a gas pressure source and an outlet that can be coupled to an object that is to be sealed. The gas inlet and the outlet are connected to each other via the interior of the container. The gas inlet and the outlet are embodied in a discharge unit that is detachably connected to the container and is preferably screwed.

22 Claims, 2 Drawing Sheets

SEALING APPARATUS

This application is a continuation of U.S. patent application Ser. No. 09/827,537 filed Apr. 6, 2001, now U.S. Pat. No. 6,766,834, which is incorporated by reference herein, which is a continuation of International application PCT/EP99/07437 filed Oct. 5, 1999.

BACKGROUND OF THE INVENTION

The invention relates to an apparatus for the sealing of inflatable articles, in particular tires, comprising a container, containing a sealant and having a gas inlet which can be connected to a gas pressure source and an outlet which can be coupled to the article to be sealed, with the gas inlet and the outlet communicating with one another via the internal space of the container.

Such apparatuses are known (for example from DE 196 52 546 A1) and serve to seal a leak in an inflatable article, for example in a punctured tire, or a tire damaged during travel, by introducing a special sealant into the tire via the tire valve and by subsequently pumping up the tire at least to a pressure at which it can be run.

SUMMARY OF THE INVENTION

It is the problem (object) underlying the invention to so further develop an apparatus of the initially named kind that is as price worthy as possible and versatile in use.

The solution of this object takes place through the features of claim 1 directed to an apparatus of the kind initially named and through the features of claim 14 directed to the extraction unit.

The provision in accordance with the invention of a separate extraction unit makes it possible to exchange the container when the sealant has been used up or is time expired, without the entire sealing apparatus having to be renewed. Furthermore, the reusable extraction unit can be used with containers of different size, and the sealing apparatus of the invention can thus be ideally matched to the respective inflatable article. Since the extraction unit is provided with a standing surface at its side remote from the container, it allows an operating position with the extraction unit standing on the ground and the container inverted.

In accordance with a preferred embodiment of the invention, the extraction unit for the in particular bottle-like container has at least one substantially cylindrical connection stub, preferably for receiving a connection section of the container resembling a bottleneck.

In this way the container and the extraction unit can be connected to one another in a particularly simple manner. The connection stub can be provided with an internal thread, so that the container, in particular its connection section provided with a corresponding external thread, simply needs to be screwed into the connection stub.

In accordance with a further preferred embodiment of the invention, an inlet duct and an outlet duct respectively extend, within a connection stub of the removal unit, in the region of their free end communicating with the container inner space, with the free ends of the inlet duct and of the outlet duct in each case not extending beyond the free end of the connection stub.

In this way the sealing apparatus of the invention can be used in two different operating positions. With the extraction unit standing on the ground, and with the container inverted with an opening disposed downwardly and connected to the connection stub of the extraction unit, the gas flows via the inlet duct into the container and—when the container is not completely full—through the sealant upwardly to the container base remote from the extraction unit. The free space above the sealant level is thereby pressurized so that the sealant is pressed through the outlet duct into the article to be sealed.

After a part of the sealant has been introduced into the article to be sealed, the sealing apparatus can be turned round and arranged with the extraction unit at the top. The sealant which remains in the container collects in the region of the base of the container, so that the free ends of the inlet duct and of the outlet duct are now exposed and are no longer dipped into the sealant. The gas which flows via the inlet duct into the container now fills the free space between the opening of the container and the sealant level and can thus flow directly via the outlet duct into the article to be sealed, whereby the latter is pumped up.

This manner of proceeding is of particular advantage in cases in which several tires of a vehicle or several chambers of an air mattress are damaged. After the introduction of a part of the sealant into, for example, the first tire to be sealed, the sealed tire can be pumped up—as explained above—by turning the sealing apparatus around, before the repair is continued with the next damaged tire. The sealing and pumping up of a plurality of damaged articles in series can be carried our particularly efficiently in this manner.

The fact that the gas entering into the container flows through the sealant during the introduction of the sealant into the article to be sealed furthermore ensures, in advantageous manner, a through-mixing of the sealant. Shaking of the sealing apparatus or of the container prior to use is thus not necessary.

When, in accordance with a further preferred embodiment of the invention, the container and extraction unit are manufactured from a preferably recyclable plastic, the sealing apparatus can be easily transported as a result of its then comparatively low inherent weight and can, in particular, be sued by people of weak stature, without effort. This is especially advantageous having regard to the above explained repair of several damaged articles in series, in which the sealing apparatus is turned around several times.

Further preferred embodiments of the invention are set forth in the subordinate claims, in the description and also in the drawing.

BRIEF DESCRIPTION OF THE DRAWINGS

The invention will be described in the following by way of example and with reference to the drawing, in which are shown.

DETAILED DESCRIPTION OF THE PREFERRED EMBODIMENTS

Figure 1:
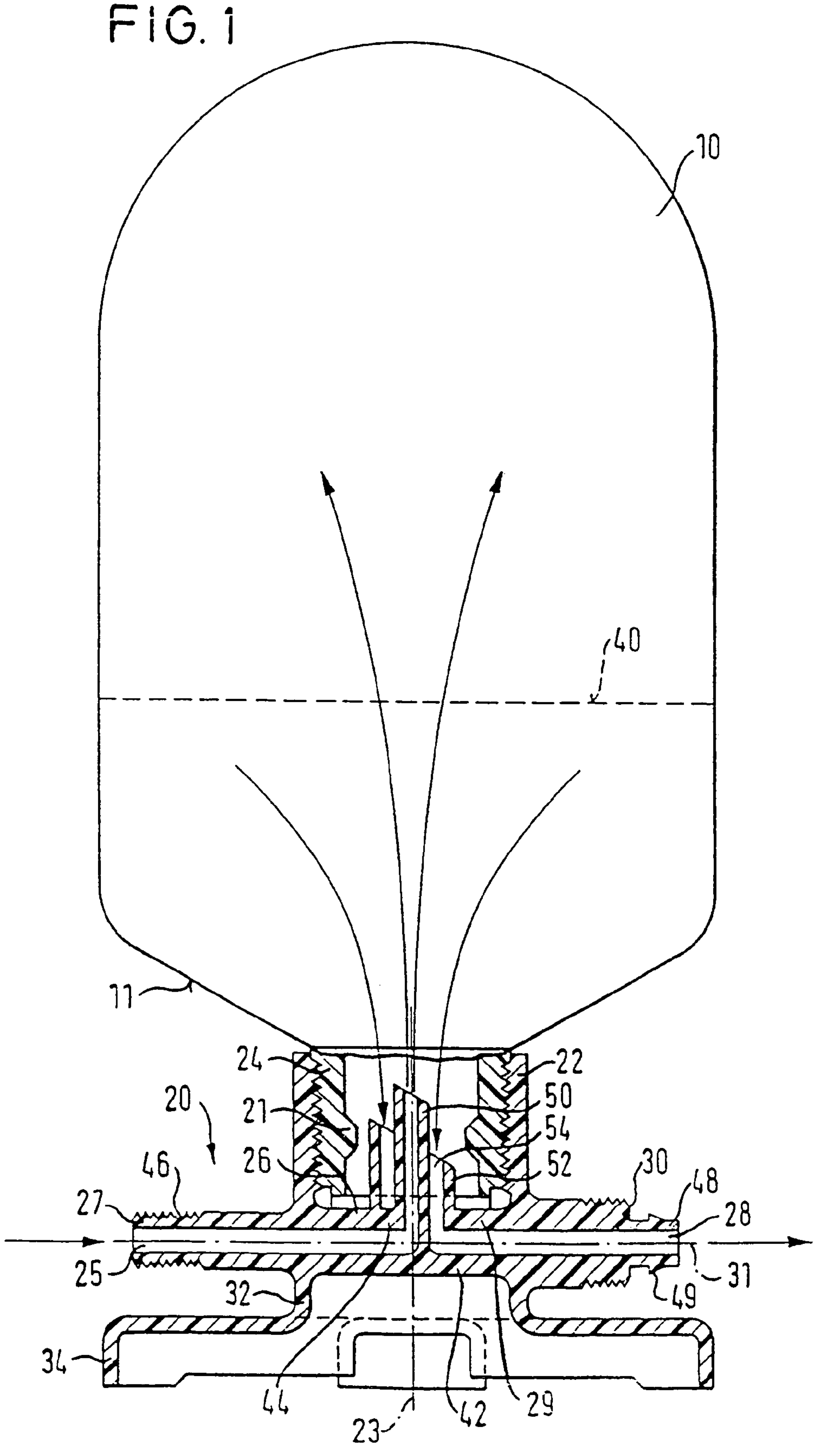
FIG. 1 a sectional side view of a sealing apparatus in accordance with the invention, and FIG. 2 the inventive sealing apparatus of FIG. 1 in an environment of use.

In the embodiment of the invention in accordance with FIG. 1 the sealing apparatus includes a bottle-shaped, pressure-tight container 10 of recyclable plastic, which has an approximately cylindrical connection section 24 formed in the manner of a bottleneck, which will be termed the neck in the following.

The neck 24 is provided at its outer side with a thread, which permits the container 10 to be screwed into a connection stub 22 having a matching inner thread of a pressure-tight extraction unit 20, likewise consisting of recyclable plastic and manufactured in one piece, in such a way that the internal space of the container is sealed off relative to the environment. The neck 24 of the container 10 and the connection stub 22 of the extraction unit 20 have approximately the same length. At its inner side the neck 24 is provided with a constriction 21 in the form of a radially inwardly projecting, ring-like bead.

The container 10 contains a liquid sealant, such as is, for example, described in the German patent application 196 52 546. In the state shown in FIG. 1 the container 10 is less than half full of the sealant, as is shown by the broken line indicating the sealant level 40. The container 10 can, for example, be designed to receive a volume of 700 to 800 ml. In the original state, prior to its first use, the container 10 is preferably fully filled with the sealant, without the inclusion of air, so that no disturbing skin formation can arise. The sealant level 40 indicated in FIG. 1 consequently represents an intermediate state after it has been taken into use, i.e. represents an already partly emptied container 10.

The connection stub 22 forms a free end of a cylindrical connection section 32 of the extraction unit 20, which is broadened in the radial direction to a pedestal section 34 at its end remote from the container 10. The maximum radial dimension of the pedestal section 34 amounts to more than twice the diameter of the connection section 32, whereby reliable standing of the sealing apparatus is ensured.

In the connection section 32 of the extraction unit 20 two base plates 42, 44 are arranged spaced apart from one another, which separate the pedestal section 34 from the connection stub 22. In the screwed in state in accordance with FIG. 1 the edge of the connection section 24 which bounds the opening of the container 10 lies on the upper base plate 44.

Between the two base plates 42, 44, inner section 26, 29 of an inlet duct 25 or of an outlet duct 28 extend in the radial direction, with their lower and upper boundary walls in each case being formed by the lower and upper base plates 42 and 44 respectively.

Outside of the connection section 32 of the extraction unit 20, the inner sections 26, 29 each merge into an outer section 27, 30. The inner sections 26, 29 and the outer section 27, 30 lie with their central axes on a common longitudinal axis 31.

The outer section 27 of the inlet duct 25 is formed as a gas inlet and has, in the region of its free end, a thread 46 preferably formed as VG8-valve thread for the connection onto a gas pressure source, not shown in FIG. 1.

The outer section 30 of the outlet duct 28 is provided with a portion 48 of reduced diameter, with hook-like coupling elements 49 formed onto its outer side, which serves for the connection to a filling line which will be explained in more detail in the following with reference to FIG. 2, via which the sealing apparatus can be connected to an article to be sealed.

Whereas the free inner cross-sectional areas of the inlet duct 25 and of the outlet duct 28 are of the same size, the outer section 30 of the outlet duct 28 has a greater wall thickness than the outer section 27 of the inlet duct 25. In deviation from the illustrated embodiment, the free inner cross-sectional areas of the inlet duct 25 and of the outlet duct 28 can also be of different size.

The inner section 26 of the inlet duct 25 merges into an inflow passage 50, the longitudinal axis of which coincides with the longitudinal axis 23 of the connection stub 22, and the free inner cross-sectional area of which is smaller than that of the inner section 26. The inflow passage 50 projects into the connection stub 22 of the removal unit 20, and thus into the neck 24 of the screwed-in container 10, with the inflow passage 50, however, not extending beyond the free end of the connection stub 22.

The inflow passage 50 is regionally arranged in the interior of a removal passage 52 of the outlet duct 28, which concentrically surrounds the inflow passage 50 and the removal passage 52 form a coaxial line system and a ring space 54 arises, onto which the inner section 29 of the outlet duct 28 is connected. The free end of the inflow passage 50 projecting out of the extraction passage 52 and the free end of the extraction passage 52 are in each case chamfered off.

The neck 24 and the container 10 can be designed such that an adapter element formed as a Venturi nozzle can be introduced into the neck 24, and in particular screwed into it.

Figure 2:
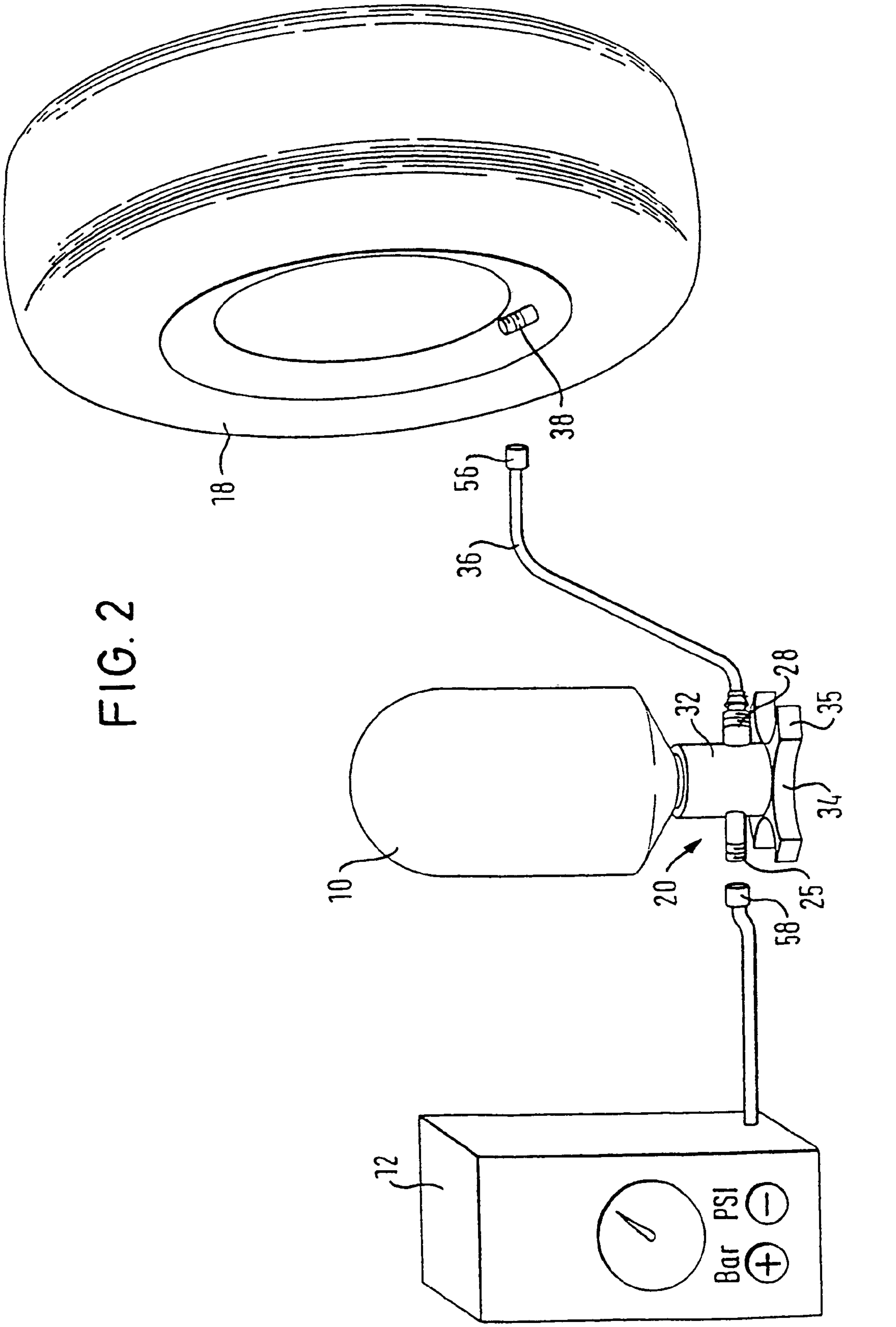

In accordance with FIG. 2 a filling line 36 formed as a hose is connected onto the extraction unit 20 via the section 48 of the outlet duct 28 and is provided at its free end with a sleeve nut 56, mating with a VG8-valve thread in order that the filling line 36 can be connected to the tire 18 which is to be sealed. The filling line 36 can either be releasably or fixedly connected to the extraction unit 20.

At the left alongside the sealing apparatus of the invention, a gas pressure source 12 is schematically illustrated in FIG. 2 with a pressure display and with operating elements for the pressure regulation and has a connection line, to the free end of which a sleeve nut 58, corresponding to the sleeve nut 56, is arranged for the connection of the gas pressure source 12 onto the inlet duct 25 of the extraction unit 20.

The gas pressure source 12 is preferably formed to make pressure air available and can, for example, be formed as a small compressor, motorcar central compressor, stationary pressure air supply system or portable pressure storage container, such as is, for example, available at filling stations, or as a hand or foot air pump. The maximum pressure which can be supplied from the gas pressure source 12 does not need to be greater than the pressure required for at least an emergency operation of the tire 18. For the emptying of the container 10 the gas pressure source 12 does not have to be able to supply any specific minimum pressure.

It can be recognized from FIG. 2 that the pedestal section 34 of the extraction unit 20 includes four feet 35 which extend in star-like manner in the radial direction away from the connection section 32.

The manner of operation of the sealing apparatus of the invention is described in the following with reference to the example of a tire 18 which is to be sealed.

First of all, the filling line 36 connected to the outlet duct 28 of the extraction unit 20 is connected to the valve 38 of the tire 18 in that the sleeve nut 56 is screwed onto the valve thread. The gas pressure source 12 can in this arrangement already be connected to the extraction unit 20 or can still be separated from the latter.

Any possibly present residual pressure in the tire 18 can either escape via a non-illustrated valve arranged in the filling line 36, in the extraction unit 20 or in the container 10, or can escape through the entire sealing apparatus via the inlet duct 25, provided the gas pressure source 12 has not yet been connected. It is also possible to first connect the filling line 36 to the tire 18 and only then to the extraction unit 20 when the residual pressure has escaped from the tire 18 via the filling line 36. When a container 10 has not yet been screwed into the extraction unit 20, it is also possible to allow the residual pressure in the tire 18 to escape directly via the connection stub 22.

In any case, a compulsory venting of the tire consequently arises so that no non-return valve is required and, in particular when using a small compressor as a gas pressure source, a starting current which is too high is avoided. For the emptying of the container 10 the gas pressure source 12 must therefore not work against a counter-pressure applied by the tire 18.

Thereafter, the gas pressure source 12 is connected, if necessary, onto the inlet duct 25 of the extraction unit 20.

If the extraction unit 20 is not already provided with a container 10 filled with sealant, then the neck 24 of a new container 10 is screwed into the connection stub 22 of the extraction unit 20, prior to or after the connection of the gas pressure source 12 onto the extraction unit 20. The opening of the container 10 is preferably sealed by means of a foil, for example, which is broken open by the chamfered ends of the inflow passage 50 and of the outflow passage 52 on being screwed into the connection stub 22.

It is also possible to provide a securing ring, formed as an extension of the connection stub, 22 or as a separate component, which, on screwing in of the container 10, is arranged between the container 10 and the extraction unit 20 in the manner of securing rings, such as are, for example, present at the lids of bottled drinks. In the case of a securing ring formed as an extension of the connection stub 22, the latter can be connected via desired kink points, in particular in the form of film hinges, to the connection stub 22, and can have a smaller wall thickness than the connection stub 22.

A securing ring of this kind is designed so that it is first pressed apart on screwing in of the container 10 by the application of a certain minimum force via the oblique shoulder 11 of the container 10, which acts as a wedge. The securing ring can be executed as a burstable ring, which is destroyed by full screwing in of the container 10.

The provision of such a securing ring makes it possible, for the simplification of the handling of the sealing apparatus, to screw the container 10 in the context of a pre-installation at first only loosely against the securing ring, with the latter being supported in the pre-installed state on the oblique shoulder 11 of the container 10. A single thread turn is sufficient to keep the container 10 on the extraction unit 20 in a manner secured against loss.

In this pre-installed state the foil which seals the opening of the container 10 is still unharmed, so that no sealant can run out. Only by overcoming the resistance offered by the securing ring to the container can the foil be broken open by the chamfered ends of the inflow passage 50 and of the extraction passage 52.

In order to prevent sealant running out of the extraction unit 20 via the inlet duct 25 prior to taking the arrangement into use, a blocking device can, for example, be provided in the inlet duct 25, or the container 10 can be screwed in the upright state to the extraction unit 20.

For the introduction of the sealant preparation into the tire 18, the sealing apparatus of the invention is placed with the extraction unit 20 on the ground, as is shown in FIG. 2, so that the container 10 is arranged with its opening to the bottom.

After activation of the gas pressure source 12, the gas flows in accordance with the path indicated by arrows in FIG. 1 via the inlet duct 25, and via its inflow passage 50 surrounded by sealant, into the container 10 and through the sealant into the region above the sealant level 40. The gas which stands under elevating pressure in this region presses the sealant via the ring space 54 of the outlet duct 28 formed by the inflow passage 50 and by the extraction passage 52 through the filing line 36 into the tire 18. The restriction 21 formed in the neck 24 during manufacture, preferably in one working step with the container 10, is so designed that it advantageously acts on the course of the flow of the sealant.

Even in the case of a container 10 which is completely filled without an air inclusion, the sealant is driven, as a result of the pressure increase caused by the gas flowing into the container 10, via the extraction passage 52 out of the container 10.

When the sealant quantity required to overcome the tire leak has been introduced into the tire 18 and a residual quantity of sealant is still present in the container 10, the sealing apparatus of the invention is turned through 180° and inverted. For this purpose, in deviation from the embodiment shown in FIGS. 1 and 2, the base side of the container 10 remote from the extraction unit 20 can be formed as a standing surface.

The sealant now collects at the side of the container 10 remote from the extraction unit 20 in the region of the container base, so that the gas which continues to flow through the inlet duct 25 into the container 10, flows directly into the outlet duct 28 and into the tire 18. In this manner the tire 18 can be pumped up to its operating pressure directly following introduction of the sealant, or at least to a pressure at which the relevant vehicle can travel over a certain distance.

After the sealing apparatus has been turned again and again placed with the removal unit 20 on the ground, then further damaged tires can optionally be sealed, with the sealant remaining in the container 10 in accordance with the above described procedure.

In order to be able to dissipate the residual pressure prevailing in the container 10 during use or after the conclusion of use, a valve, which is not shown in FIGS. 1 and 2, can be provided in the container wall. In accordance with a particularly simple embodiment, this can be executed as a relief bore with a diameter of, for example, 0.5 mm, which is formed in the lower base plate and which opens into the inlet duct 25.

For the adaptation to different conditions of use, different adapter elements can be used in conjunction with the inlet duct 25, the outlet duct 28 and/or the filling line 36 and also filling lines of different length.

Furthermore, the extraction unit 20 can be combined in advantageous manner with different containers 10 which differ with respect to their shape, their size and/or the sealant contained therein.

Particularly having regard to the danger from passing vehicles to a person with a tire puncture, an advantage of the sealing apparatus of the invention is to be seen in the fact that the user merely needs to stand in the near vicinity of the tire 18 for the connection of the filling line 36 to the valve 38. The operation of the gas pressure source 12, the screwing in of the container 10, the turning around of the sealing apparatus and also the monitoring of the sealing and pumping up processes via the display of the gas pressure source 12 can take place at a secure location remote from the tire to be sealed.

What is claimed is:

1. Apparatus for sealing of inflatable articles, comprising a container, having an opening, containing a sealant and having a gas inlet which can be connected to a gas pressure source and an outlet which can be coupled to the article to be sealed, with the gas inlet and the outlet communicating with one another via the internal space of the container, characterized in that the container is made pressure-tight, has a bottleneck-like connection section and is releasably connectable to a substantially cylindrical connection stub of an extraction unit in that the gas inlet which can be connected to the gas pressure source and the outlet which can be coupled to the article to be sealed are made as an inlet duct and as an outlet duct in the extraction unit and each extend inside the connection stub in the region of their free end communicating with the internal space of the container, wherein the gas puts the free space above the sealant level under pressure and presses the sealant through the outlet line into the article to be sealed when the container is coupled to the connection stub of the extraction unit with the opening facing down.

2. Apparatus in accordance with claim 1, characterized in that the container can be screwed to the cylindrical connection stub of the extraction unit.

3. Apparatus in accordance with claim 1, characterized in that the opening of the container has a seal which is broken open by parts disposed inside the connection stub on the screwing into the connection stub.

4. Apparatus in accordance with claim 1, characterized in that the inlet duct of the extraction unit which can be connected to the gas pressure source and the outlet duct of the extraction unit which is to be coupled to the article to be sealed extend approximately perpendicular to the longitudinal axis of the connection stub.

5. Apparatus in accordance with claim 1, characterized in that the inlet duct, and the outlet duct each extend inside the connection stub of the extraction unit in the region of their free end communicating with the interior space of the container.

6. Apparatus in accordance with claim 1, characterized in that the free ends of the inlet duct and of the outlet duct each do not extend beyond the free end of the connection stub of the extraction unit.

7. Apparatus in accordance with claim 1, characterized in that the inlet duct and the outlet duct have passage sections extending into the connection stub.

8. Apparatus in accordance with claim 7, characterized in that the passage sections extend approximately parallel to the longitudinal axis of the connection stub.

9. Apparatus in accordance with claim 7, characterized in that the inlet duct and the outlet duct extend coaxially at least regionally.

10. Apparatus in accordance with claim 9, characterized in that the inlet duct and the outlet duct extend coaxially in the region of free ends communicating with the interior space of the container.

11. Apparatus in accordance with claim 3, characterized in that the free ends of the inlet duct and/or of the outlet duct are each made to break open the seal closing the opening of the container.

12. Apparatus in accordance with claim 1, characterized in that the gas pressure source consists of a small-capacity compressor or of a motor vehicle central compressor.

13. Apparatus in accordance with claim 1, characterized in that the extraction unit is provided with a standing surface on its side remote from the container in the state connected to the container.

14. Apparatus in accordance with claim 13, characterized in that the extraction unit includes an at least substantially cylindrical connection section which is made as a connection stub for the container at its one-end and which connects to a foot section, whose side remote from the container is formed as a standing surface, at its other end.

15. Apparatus in accordance with claim 1, characterized in that a filling line made as a hose, which can be coupled to a valve of the article to be sealed, can be coupled to an outer section of the outlet duct of the extraction unit.

16. Apparatus in accordance with claim 1, characterized in that it is made for the compulsory venting of an article to be sealed connected to the outlet via the filling line.

17. Apparatus in accordance with claim 1, characterized in that the side of the container remote from the extraction unit is made as a standing surface.

18. An apparatus for sealing inflatable articles, the apparatus comprising:

a container having a bottleneck portion and an internal space for a sealant;

an extraction unit having a substantially cylindrical connection stub for releasable connection to the bottleneck portion of the container;

a gas inlet of the extraction unit for being connected to a gas pressure source and an outlet of the extraction unit for being coupled to the article to be sealed, the gas inlet and the outlet communicating with one another via the container internal space; and the gas inlet and the outlet of the extraction unit comprise input and output ducts extending in coaxial relation to one another and disposed in the cylindrical connection stub of the extraction unit.

19. An apparatus for sealing inflatable articles, the apparatus comprising:

a container having an internal space for a sealant and a connection portion comprising a seal for the container;

an extraction unit having a connection stub for releasable connection to the container;

the connection stub comprising surfaces for breaking open the container seal upon connection of the extraction unit to the container; and a gas inlet of the extraction unit for being connected to a gas pressure source and an outlet of the extraction unit for being coupled to the article to be sealed, the gas inlet and the outlet communicating with one another via the container internal space.

20. A method for sealing inflatable articles using a container having an internal space containing a sealant, the method comprising:

connecting an extraction unit having an inlet and an outlet to the container;

connecting a gas pressure source to the inlet of the extraction source;

connecting the outlet of the extraction unit to an article to be sealed; and directing a flow of gas from the gas pressure source through the sealant into the internal space to mix the sealant and to increase pressure in the internal space to press the sealant out of the outlet of the extraction unit;

wherein the container comprises a connection portion comprising a screw thread, and wherein the step of containing the extraction unit with to the container comprises mating a screw thread of the extraction unit with the screw thread of the container.

21. A method of sealing inflatable articles using a container having an internal space containing a sealant, comprising:

connecting an extraction unit having an inlet and an outlet to the container;

connecting a gas pressure source to the inlet of the extraction unit;

connecting the outlet of the extraction unit to an article to be sealed; and directing a flow of gas from the gas pressure source through the sealant into the internal space to mix the sealant and to increase pressure in the internal space to press the sealant out of the outlet of the extraction unit;

wherein the container comprises a seal, and the method comprises breaking the seal of the container during the connecting step.

22. Apparatus according to claim 3, wherein the seal comprises a foil.

* * * * *